(12) United States Patent
Pavuluri et al.

(10) Patent No.: US 12,135,810 B2
(45) Date of Patent: Nov. 5, 2024

(54) DYNAMIC USER DASHBOARD BASED ON ARTIFICIAL INTELLIGENCE TECHNIQUES

(71) Applicant: Dell Products L.P., Round Rock, TX (US)

(72) Inventors: Naga Navya Nandini Nidhi Pavuluri, Guntar (IN); Shibi Panikkar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 165 days.

(21) Appl. No.: 17/834,048

(22) Filed: Jun. 7, 2022

(65) Prior Publication Data

US 2023/0394164 A1 Dec. 7, 2023

(51) Int. Cl.
*G06F 21/62* (2013.01)
*G06F 21/31* (2013.01)
*G06F 40/40* (2020.01)

(52) U.S. Cl.
CPC ........ *G06F 21/6218* (2013.01); *G06F 21/316* (2013.01); *G06F 40/40* (2020.01); *G06F 2221/2141* (2013.01)

(58) Field of Classification Search
CPC ...... G06F 40/40; G06F 40/20; G06F 21/6218; G06F 21/316; G06F 2221/2141
See application file for complete search history.

(56) References Cited

U.S. PATENT DOCUMENTS

| | | | | |
|---|---|---|---|---|
| 10,943,072 B1 * | 3/2021 | Jaganmohan | ......... | G06N 5/041 |
| 2015/0212716 A1 * | 7/2015 | Mithal | ............... | G06F 3/04847 |
| | | | | 715/747 |
| 2019/0034500 A1 * | 1/2019 | Das | .................. | G06F 16/24522 |
| 2019/0095507 A1 * | 3/2019 | Elisseeff | ................. | G06N 5/01 |
| 2019/0361795 A1 * | 11/2019 | Cole | .................. | G06F 11/3636 |
| 2020/0233624 A1 * | 7/2020 | Peng | ...................... | G10L 15/18 |
| 2022/0171869 A1 * | 6/2022 | Chin | ....................... | H04L 67/53 |
| 2022/0317823 A1 * | 10/2022 | Nugraha | ............ | G06F 3/04845 |

OTHER PUBLICATIONS

Kinsey, Stuart, A comprehensive guide to KPI Dashboards, SimpleKPI. com, available at https://www.simplekpi.com/Blog/KPI-Dashboards-a-comprehensive-guide (last accessed Jun. 6, 20220), published Jan. 3, 2022.

* cited by examiner

*Primary Examiner* — Jonathan A Bui

(74) *Attorney, Agent, or Firm* — Ryan, Mason & Lewis, LLP

(57) ABSTRACT

Methods, apparatus, and processor-readable storage media for a dynamic user dashboard are provided herein. An example computer-implemented method includes obtaining information related to characteristics of a user within an organization; generating a user context for the user based on the information; generating a data structure comprising mappings between the user context and one or more initial intents associated with the characteristics of the user; processing at least one user input using one or more natural language understanding techniques to identify at least one language-based intent; determining a derived intent based at least in part on the at least one language-based intent and the user context; dynamically updating the data structure based on the derived intent; and rendering data corresponding to the organization to a visual dashboard of the user based at least in part on the updated data structure.

20 Claims, 7 Drawing Sheets

DYNAMIC USER DASHBOARD BASED ON ARTIFICIAL INTELLIGENCE TECHNIQUES

FIELD

The field relates generally to information processing systems, and more particularly to user dashboards for such systems.

BACKGROUND

Analytical dashboards are increasingly being used to provide a comprehensive overview of data to users within an organization. Such dashboards often include vast amounts of complex data pertaining to key performance indicators (KPIs), for example. Generally, static access controls are used to determine the data and/or KPIs that are output to the dashboard for a given user. However, the access controls can be restrictive and difficult to manage, which can cause the dashboard to have missing and/or unnecessary information. This is particularly challenging when users within an organization frequently change roles and/or assignments as the access controls for the users need to be manually updated.

SUMMARY

Illustrative embodiments of the disclosure provide a dynamic user dashboard based on artificial intelligence techniques. An exemplary computer-implemented method includes obtaining information related to characteristics of a user within an organization; generating a user context for the user based on the information; generating a data structure comprising mappings between the user context and one or more initial intents associated with the characteristics of the user; processing at least one user input using one or more natural language understanding techniques to identify at least one language-based intent; determining a derived intent based at least in part on the at least one language-based intent and the user context; dynamically updating the data structure based on the derived intent; and rendering data corresponding to the organization to a visual dashboard of the user based at least in part on the updated data structure.

Illustrative embodiments can provide significant advantages relative to conventional data protection techniques. For example, technical problems associated with displaying the right information on a dashboard for a specific user are mitigated in one or more embodiments by dynamically updating the information displayed on the dashboard based at least in part on a context of the user and artificial intelligence techniques that learn the behavior of the user with respect to the dashboard.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Conventional approaches for updating analytical dashboards generally restrict the user in at least the following ways. First, each team or domain of users of an organization generally has its own online analytical processing (OLAP) data model. Such models are restrictive, and any new variation requires a new model to be developed, thereby leading to duplication of work across the organization. Second, each KPI is designed for and mapped to a particular role, which allows every user in that role to see the same report. However, different users having the same role often want to have different data or KPIs displayed on the dashboard. Typically, this requires a given user to be assigned a different or additional role. In some instances, this requires a new role to be manually created by a system administrator, for example, as this type of customization is restricted by conventional access control techniques (e.g., Role Based Access Control (RBAC), Attribute Based Access Control (ABAC), or Policy Based Access Control). In addition, KPIs are typically created based on generic requirements determined, for example, by a product manager or relevant team. This approach can be suitable for web applications as there are limited differences between users. However, in the context of KPIs and analytical dashboards, each user is typically different, and it is often beneficial to have different KPIs for different users. Further, each user is typically presented with the same KPI when the users initially log into the dashboard. If a particular user is mainly interested in a KPI that is displayed elsewhere on the dashboard, most existing dashboards require the user to perform multiple user actions (e.g., keyboard presses and/or mouse clicks) to get to the desired location.

One or more embodiments described herein address such technical problems by, for example, creating dynamic semantic data links between outputs (e.g., KPIs) based on an initial user context. Additionally, at least some embodiments apply artificial intelligence techniques to flexibly update the dashboard based on user intent.

Figure 1:
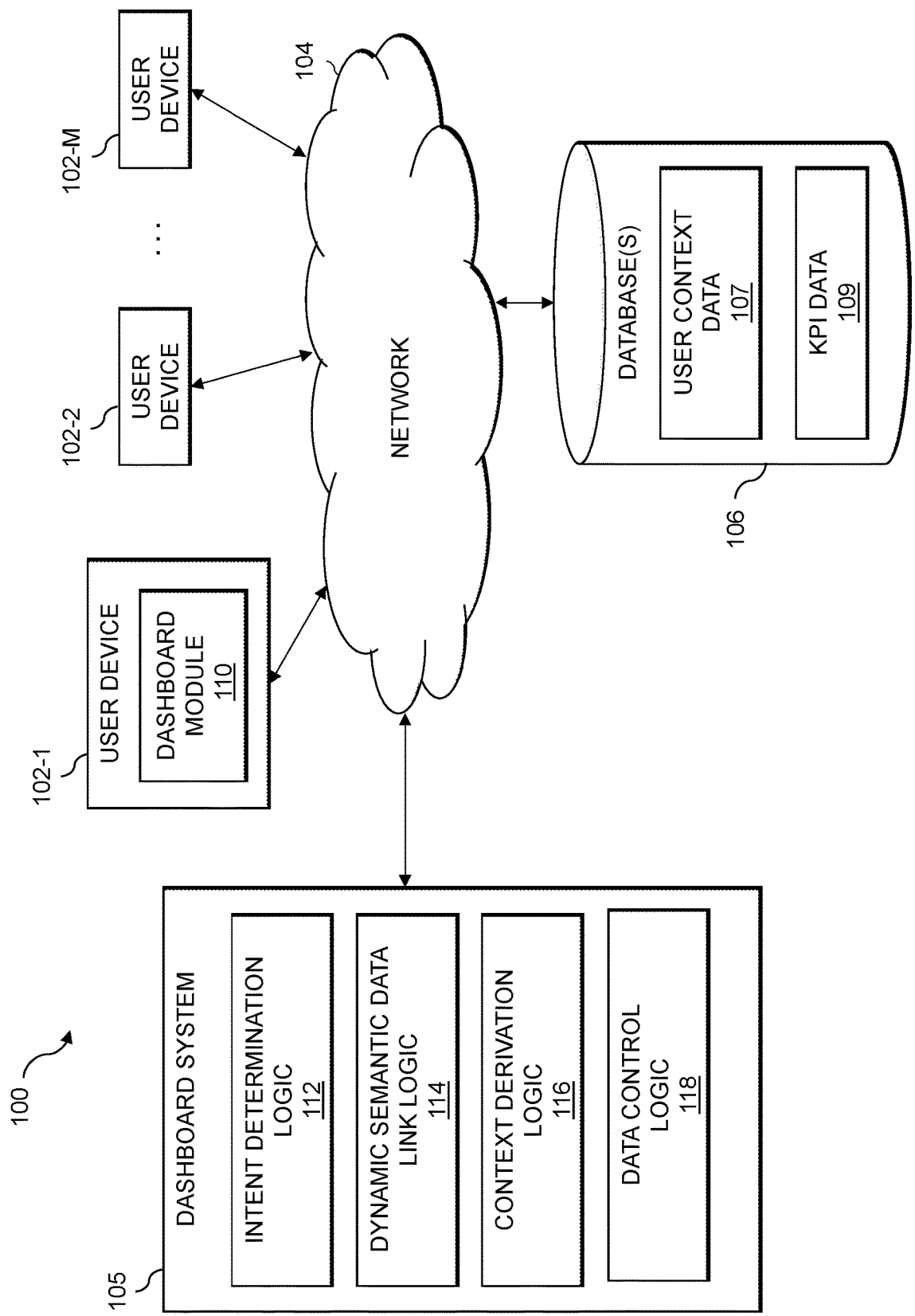
FIG. 1 shows an information processing system configured for a dynamic user dashboard based on artificial intelligence techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, ... 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a dashboard system 105.

In the FIG. 1 example, user device 102-1 includes a dashboard module 110 that is configured to receive information from the dashboard system 105 for rendering and displaying information on a dynamic user dashboard, as described in more detail elsewhere herein. In some embodiments, the dashboard module 110 can be implemented as a standalone application or at least in part by a web browser on user device 102-1, for example. Although not explicitly shown in FIG. 1, each of the other user devices may also include a separate dashboard module 110.

The user devices 102 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the dashboard system 105 can have at least one associated database 106 configured to store user context data 107 and KPI data 109. Generally, the user context data 107 includes user characteristics (or attributes) for different users. In some embodiments, the user attributes may include information related to one or more of: job profiles, job types, assigned projects, organization level, teams, and possibly other information related to roles or jobs. In some embodiments, the KPI data 109 pertains to independent KPI modules or data structures that can be published across a given organization (e.g., to one or more of user devices 102), such as via one or more application programming interfaces (APIs) and/or one or more micro front ends (MFEs). Each KPI module can be annotated with information related to owners, teams, personally identifiable information (PII), and other high level data classifications related to the organization, for example.

An example database 106, such as depicted in the present embodiment, can be implemented using one or more storage systems associated with the dashboard system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the dashboard system 105 are one or more input-output devices, which illustratively comprise keyboards, displays or other types of input-output devices in any combination. Such input-output devices can be used, for example, to support one or more user interfaces to the dashboard system 105, as well as to support communication between dashboard system 105 and other related systems and devices not explicitly shown.

Additionally, the dashboard system 105 in the FIG. 1 embodiment is assumed to be implemented using at least one processing device. Each such processing device generally comprises at least one processor and an associated memory, and implements one or more functional modules for controlling certain features of the dashboard system 105.

More particularly, the dashboard system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the dashboard system 105 to communicate over the network 104 with the user devices 102, and illustratively comprises one or more conventional transceivers.

The dashboard system 105 further comprises intent determination logic 112, dynamic semantic data link logic 114, context derivation logic 116, and data control logic 118.

Generally, the intent determination logic 112 applies artificial intelligence (AI) techniques to determine intents of respective user inputs (e.g., from user devices 102).

The dynamic semantic data link logic 114 maintains links or mappings between a given user and KPIs based at least in part on the user context data 107 as well as the intents determined by intent determination logic 112. The context derivation logic 116 is used to derive a context of a given user, based at least in part on the user context data 107, that is used to determine which information is to be output to the dashboard of the user. Optionally, the data control logic 118 can restrict specific types of information from being rendered to a dashboard of a given user. Elements 112, 114, 116, and 118 are described in further detail elsewhere herein.

It is to be appreciated that this particular arrangement of elements 112, 114, 116, and 118 illustrated in the dashboard system 105 of the FIG. 1 embodiment is presented by way of example only, and alternative arrangements can be used in other embodiments. For example, the functionality associated with the elements 112, 114, 116, and 118 in other embodiments can be combined into a single module, or separated across a larger number of modules. As another example, multiple distinct processors can be used to implement different ones of the elements 112, 114, 116, and 118 or portions thereof. As another example, at least a portion of the functionality of one or more of elements 112, 114, 116, and 118 can be implemented by one or more of the user devices 102.

At least portions of elements 112, 114, 116, and 118 may be implemented at least in part in the form of software that is stored in memory and executed by a processor.

It is to be understood that the particular set of elements shown in FIG. 1 for dashboard system 105 involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the dashboard system 105 and database(s) 106 can be on and/or part of the same processing platform.

Exemplary processes utilizing at least a portion of elements 112, 114, 116, and 118 of an example dashboard system 105 in computer network 100 will be described in more detail with reference to, for example, the flow diagrams of FIGS. 2-5.

Figure 2:
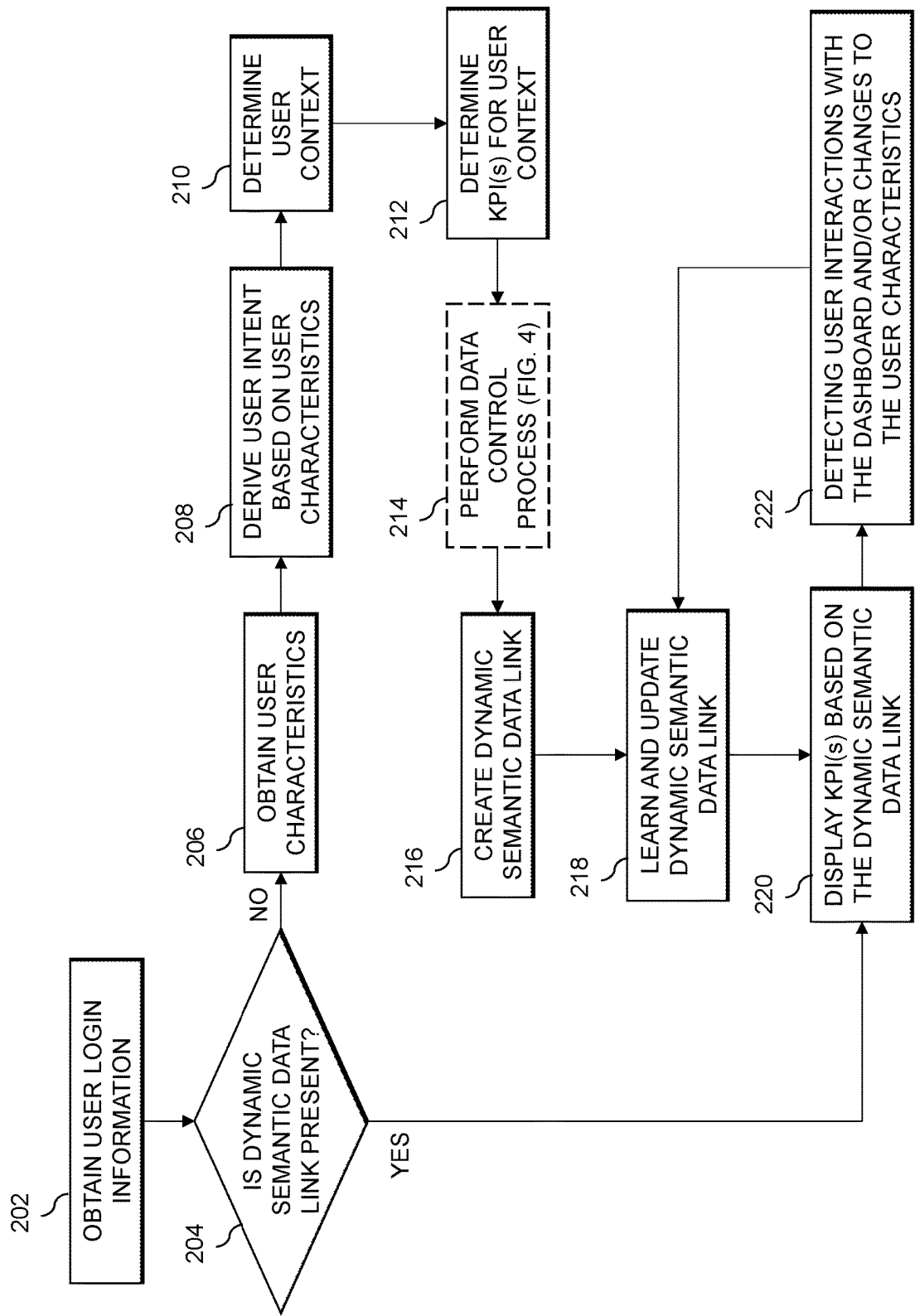
FIG. 2 shows a flow diagram of a process for providing a dynamic user dashboard in an illustrative embodiment.

Referring now to FIG. 2, this figure shows a process for providing a dynamic user dashboard in an illustrative embodiment.

Step 202 includes obtaining user login information of a user for logging into a dashboard.

Step 204 includes performing a test to determine whether a semantic data link is present for the user. If no, then the process continues to step 206; otherwise, the process continues to step 220.

Step 206 includes obtaining one or more user characteristics. Some examples of user characteristics include one or more roles of the user within an organization, one or more levels of the user within an organization, one or more projects assigned to the user, and/or one or more assignments assigned to the user.

Step 208 includes deriving a set of possible intents based on the user characteristics. For example, the user intents can be derived using one or more AI techniques applied to previous interactions with a given KPI of different users. The AI techniques, in some examples, may include natural language understanding (NLU) techniques (such as Rasa NLU, which is a platform for intent classification).

Step 210 includes determining a user context based on the obtained user characteristics and the set of possible intents. In some examples, the user context is linked to a user identifier (such as a username of the user). The user context can include user information about the set of intents relevant to that information.

Step 212 includes determining one or more KPIs based on the user context.

Figure 4:
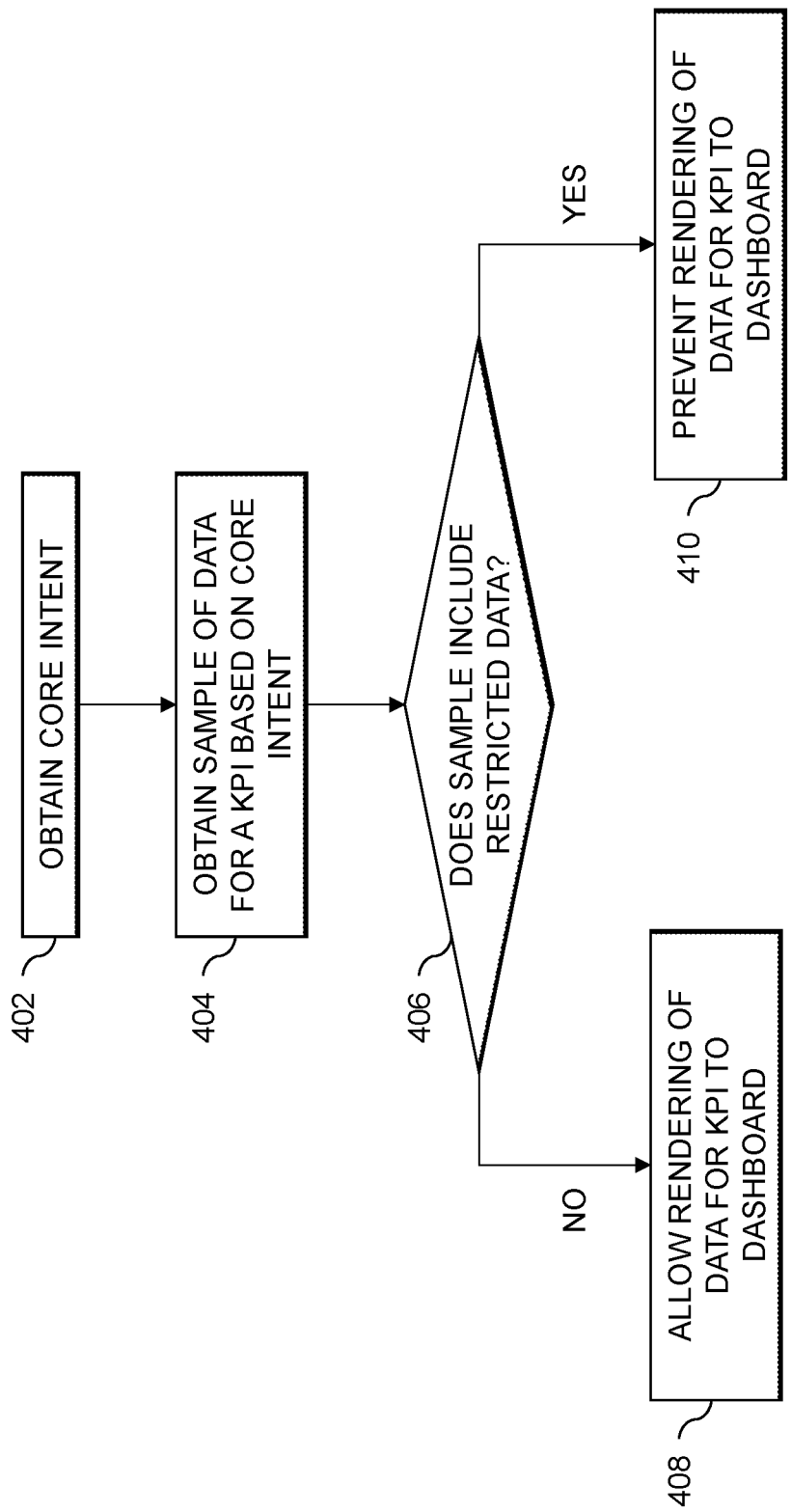
FIG. 4 shows a flow diagram of a data control process in an illustrative embodiment.

Step 214 is optional (as indicated by the dashed box) and includes performing a data control process, as described in more detail in conjunction with FIG. 4, for example.

Step 216 includes creating a dynamic semantic data link for the user. The dynamic semantic data link in some embodiments maps KPIs to a user based on the user context and one or more intents.

Step 218 includes learning and updating the dynamic semantic data link for the user. For example, when a new task or role is assigned to the user, the dynamic semantic data link for the user can be updated to map any KPIs associated with the new tasks or roles so that they are visible on the dashboard without needing a system administrator to manually make such changes. The dynamic semantic data link that is initially created, in one or more embodiments, is based on the customer context and derived intents. Thereafter, the dynamic semantic data link can be updated based at least in part on feedback from step 222, discussed below.

Step 220 includes displaying information associated with the one or more KPIs on a dashboard of the user.

Step 222 includes identifying user interactions with the dashboard and/or any changes to the user characteristics, which are then provided as feedback to step 218 to continuously learn and update the dynamic semantic data link for the user. For example, one or more core intents can be derived based on user interactions with the user. The dynamic semantic data link can then be updated at step 218 based on the core intents, as described in more detail elsewhere herein.

Accordingly, the FIG. 2 process can create a dynamic semantic data link for a given user, which can be continuously updated based on a user context. In some embodiments, a copy of a dynamic semantic data link can be encrypted and stored in a browser (e.g., as a cookie) or in a dashboard application. The dynamic semantic data link defines what information is displayed on the dashboard of the user.

In some embodiments, two different types of intent can be derived for a given user input. Specifically, a first intent is a language-based intent determined from the user input, and a second intent represents a derived intent (also referred to herein as an actual intent or a core intent) of the user. The term "derived intent" in this context and elsewhere herein refers to the intent that is determined after taking into account the user context.

Figure 3:
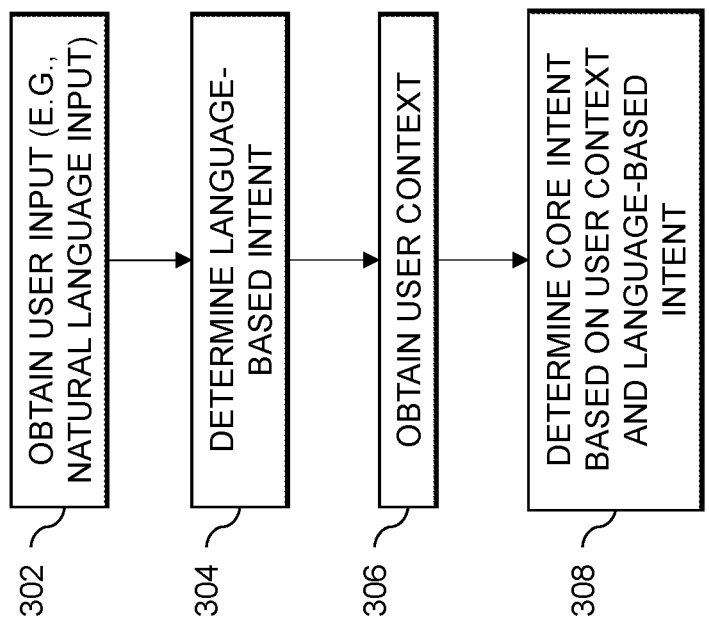
FIG. 3 shows a flow diagram of a process for determining a core intent for a given user input in an illustrative embodiment.

By way of example, assume that a first user is a sales manager, and a second user is a CEO (chief executive officer) of a particular organization. Also assume that the sales manager and the CEO each request the following information to be displayed on their respective dashboards: "Show me enterprise sales." The language-based intent for this input is determined, in some embodiments, by an NLU platform. For example, the NLU platform may derive the same intent for each user (e.g., "Enterprise Sales"), and this intent can be mapped to a particular KPI (e.g., a detailed enterprise sales report). If the user contexts are not considered, then both the sales manager and the CEO are provided the detailed enterprise sales report in the dashboard. Even though the CEO and sales manager provided the same input, the actual intent of the CEO might be to have the dashboard display an enterprise sales summary. FIG. 3 shows an example of a process that addresses such issues.

FIG. 3 shows a process for deriving a core intent for a given user input in an illustrative embodiment. Step 302 includes obtaining a user input. The user input can be in a suitable modality, such as voice or text. Step 304 determines a language-based intent of the user input (in a similar manner as described in step 208, for example). Step 306 includes obtaining the user context for a given user. Step 308 includes determining a core intent based on the user context and the language-based intent.

In some embodiments, when a user logs in for the first time, there is no user initiated intent present as the user has not interacted with the dashboard. In this case, all intents can be based on the user information (e.g., the user level within the organization, job assignments, etc.), and the user context will be mapped to a set of intents that are resolved for the user by default. After the user logs in, the user can interact with the system to request different KPIs. As an example, a sales manager position can be assigned a "summary sales report" by default. If a particular sales manager subsequently requests a detailed sales report, then some embodiments can learn and update the dynamic semantic data link for this particular user. For subsequent logins, the dashboard can display the detailed report along with the summary sales report, for example.

According to some embodiments, core intents can be defined at the time a KPI is created and can be mapped to different levels of a given customer context. In this way, when a user logs into the dashboard, the user context is processed to derive the core intent. Optionally, the customer context can also be processed (e.g., by data control logic 118) using AI techniques to determine if the core intent is associated with any viewing limitations, as described in FIG. 4, for example.

FIG. 4 shows an example of a flow diagram of a data control process in an illustrative embodiment. Step 402 includes obtaining a core intent derived for a user. Step 404 includes obtaining a sample of data for a KPI based on the core intent. Step 406 includes a test to determine whether the sample includes restricted data. For example, step 406 may include a PII data detection module, or one or more rule-based systems to detect other types of regulated data. In some embodiments, step 406 can process annotations in a KPI that indicate whether the KPI includes restricted data. For example, when a KPI is published to the system (e.g., to the at least one database 106), then the publisher can provide annotations with respect to core intents and user context components, for example. In some embodiments, a system administrator can configure viewing restriction rules for different components of a user context. If the result of the test of step 406 is no, step 408 includes allowing the rendering of the data for the KPI to the dashboard. Otherwise, step 410 includes preventing the data for the KPI from being rendered to the dashboard of the user. Alternatively, or additionally, step 410 can include automatically masking or removing portions of the data before it is displayed to the dashboard.

When the user logs into the dashboard, the core intent is derived based on the data that the user wants to access. For each user, a dynamic semantic data link is created and saved (e.g., as a cookie in a web browser or on the device of the user). The dynamic semantic data link can be continuously updated in some embodiments based on the user actions and behavior. In some embodiments, the dynamic semantic data link can be recreated for a given user, for example, if the user changes organizations or changes jobs within the organization.

As a non-limiting example, the dynamic semantic data link can have the following entity mappings: (i) a user is mapped to one user context; (ii) the user context can have multiple types of user information; (iii) the user context can be mapped to multiple intents (e.g., initial intents and/or derived intents); and (iv) each intent can be mapped to one or more KPIs along with the order in which the KPIs should be rendered.

In some embodiments, the dynamic semantic data link is updated as the user interacts with the dashboard. As an example, assume a first KPI (e.g., a summary view of a report) is rendered in the dashboard, and then the user requests a different KPI (e.g., a detailed view of the report). The second KPI is then rendered to the dashboard. In some embodiments, an amount of time that a user spends viewing a particular KPI is tracked. If the time exceeds some threshold value, then the dynamic semantic data link can be updated to include the KPI. Then, the next time the user logs into the dashboard, the second KPI can also be displayed in the dashboard. Accordingly, the dynamic semantic data link can be updated as the user interacts with the dashboard and/or when the user context changes.

In some embodiments, a given KPI can be deployed as a KPI module for a specific domain. For example, a KPI module can be implemented as an WIFE (that provides the user interface representation of the KPI) and/or as an API (that provides the KPI data). In some embodiments, the KPI modules can be accessed using a REST (representational state transfer) endpoint or a GraphQL query language. The KPI modules can be developed and published with the domain details annotated in the respective KPI modules. A given KPI module in some embodiments includes annotation details, such as ownership details, logical segregation of KPI, accessibility of the KPI, PII in the KPI, a REST endpoint, and testing details, for example. In some embodiments, the annotation details may indicate which users can access the KPI.

Figure 5:
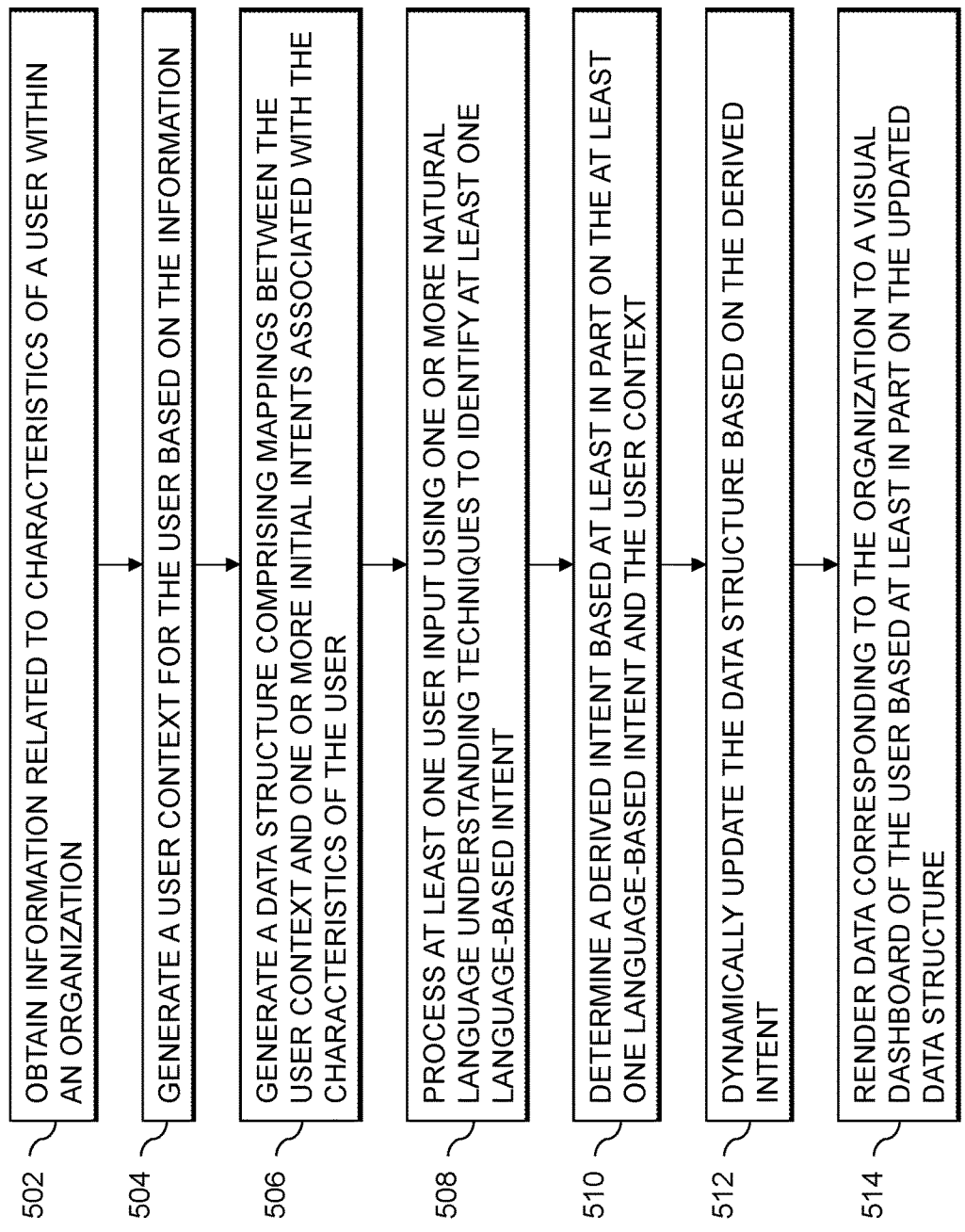
FIG. 5 shows a flow diagram of a process for providing a dynamic user dashboard based on artificial intelligence techniques in an illustrative embodiment.

FIG. 5 is a flow diagram of a process for providing a dynamic user dashboard based on artificial intelligence techniques in an illustrative embodiment. It is to be understood that this particular process is only an example, and additional or alternative processes can be carried out in other embodiments.

In this embodiment, the process includes steps 502 through 514. These steps are assumed to be performed by the dashboard system 105 utilizing at least a portion of elements 112, 114, 116, and 118.

Step 502 includes obtaining information related to characteristics of a user within an organization. Step 504 includes generating a user context for the user based on the information. Step 506 includes generating a data structure comprising mappings between the user context and one or more initial intents associated with the characteristics of the user. Step 508 includes processing at least one user input using one or more natural language understanding techniques to identify at least one language-based intent. Step 510 includes determining a derived intent based at least in part on the at least one language-based intent and the user context. Step 512 includes dynamically updating the data structure based on the derived intent. Step 514 includes rendering data corresponding to the organization to a visual dashboard of the user based at least in part on the updated data structure.

The at least one user input may be processed in response to rendering initial data corresponding to the organization to the visual dashboard based at least in part on the mappings between the user context and one or more initial intents. The at least one user input comprises a natural language input that requests the data. The data structure may be updated to include a mapping between the derived intent and the data. The characteristics may include at least one of: one or more roles, one or more organization levels associated with the user, one or more job types associated with the user, one or more job profiles associated with the user, one or more projects assigned to the user, and one or more groups associated with the user. The data corresponding to the organization may correspond to at least one key performance indicator. The data structure may be stored on a device associated with the user. The rendering may include determining whether the user is authorized to view the data corresponding to the organization based at least in part on the user context. The data corresponding to the organization may include one or more annotations corresponding to the characteristics of the user; and the rendering may be based on at least some of the one or more annotations.

Accordingly, the particular processing operations and other functionality described in conjunction with the flow diagram of FIG. 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly improve analytical dashboards using dynamic semantic data links to update the dashboard according to the core intent of the user. These and other embodiments can effectively overcome problems associated with existing testing techniques that rely on role-based or attribute-based access controls, which are restrictive and inefficient.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
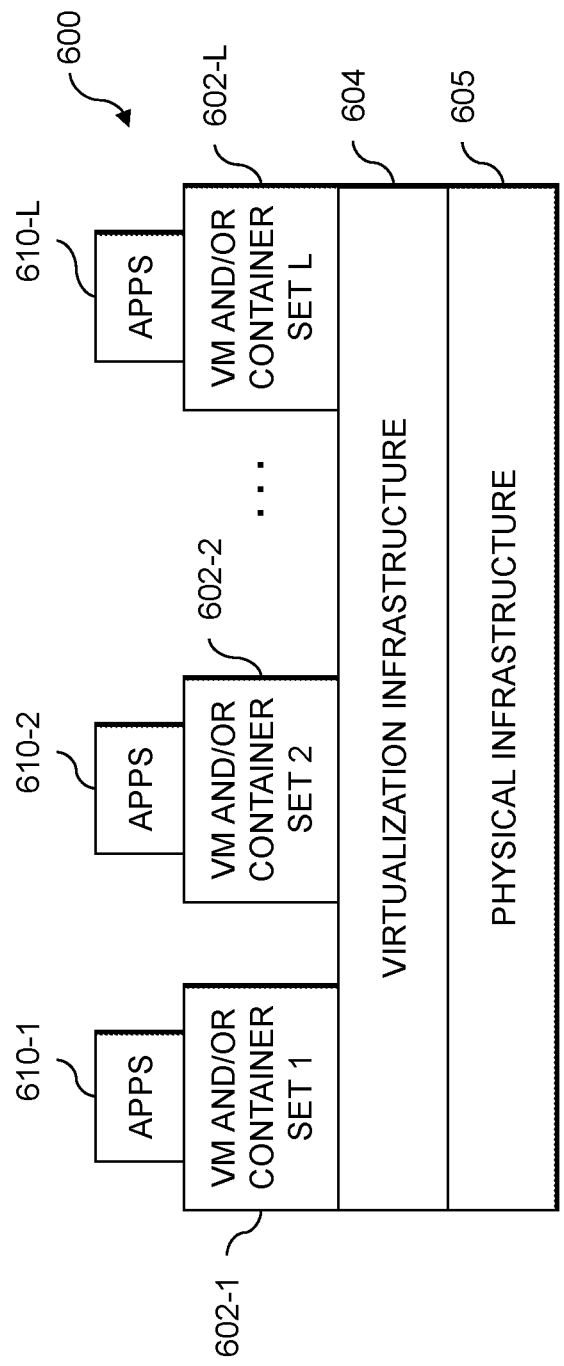
FIGS. 6 and 7 show examples of processing platforms that may be utilized to implement at least a portion of an information processing system in illustrative embodiments.
Figure 7:
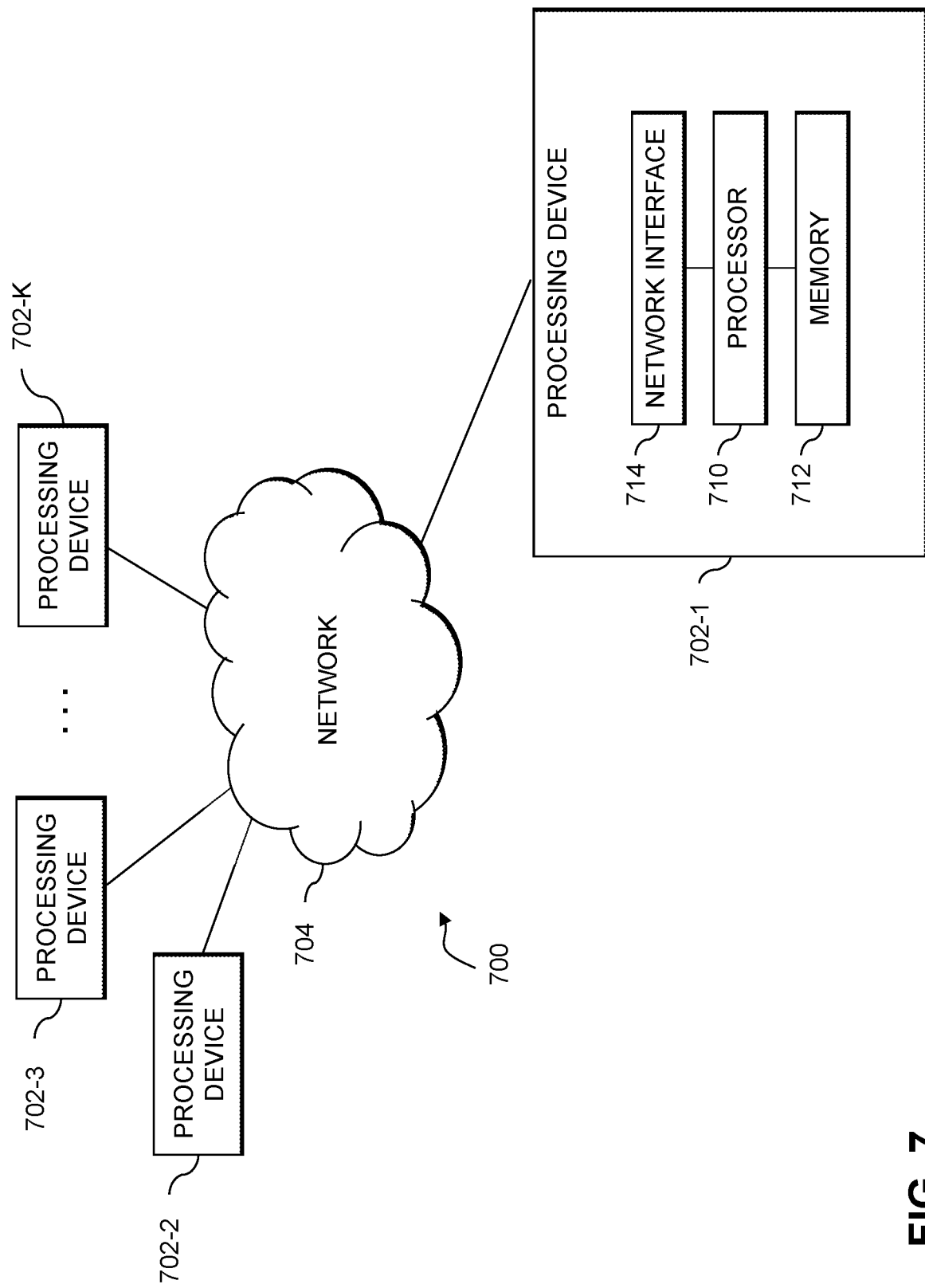

FIG. 6 shows an example processing platform comprising cloud infrastructure 600. The cloud infrastructure 600 comprises a combination of physical and virtual processing resources that are utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

A hypervisor platform may be used to implement a hypervisor within the virtualization infrastructure 604, wherein the hypervisor platform has an associated virtual infrastructure management system. The underlying physical machines comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, ... 702-K, which communicate with one another over a network 704.

The network 704 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 comprises a microprocessor, a microcontroller, an ASIC, an FPGA or other type of processing circuitry, as well as portions or combinations of such circuitry elements.

The memory 712 comprises RAM, ROM or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
    obtaining information comprising characteristics of a user within an organization, wherein at least one of the characteristics corresponds to at least one role of the user;
    generating a user context for the user based on the information;
    generating a data structure comprising mappings between the user context and one or more initial intents associated with the characteristics of the user;
    processing at least one user input using one or more natural language understanding techniques to identify at least one language-based intent;
    determining a derived intent based at least in part on the at least one language-based intent and the user context;
    dynamically updating the data structure based on the derived intent; and
    rendering data corresponding to the organization to a visual dashboard of the user based at least in part on the updated data structure;
    wherein the method is performed by at least one processing device comprising a processor coupled to a memory.

2. The computer-implemented method of claim 1, wherein the at least one user input is processed in response to rendering initial data corresponding to the organization to the visual dashboard based at least in part on the mappings between the user context and one or more initial intents.

3. The computer-implemented method of claim 1, wherein the at least one user input comprises a natural language input that requests the data.

4. The computer-implemented method of claim 1, wherein the data structure is updated to include a mapping between the derived intent and the data.

5. The computer-implemented method of claim 1, wherein the characteristics further comprise at least one of: one or more organization levels associated with the user, one or more job types associated with the user, one or more job profiles associated with the user, one or more projects assigned to the user, and one or more groups associated with the user.

6. The computer-implemented method of claim 1, wherein the data corresponding to the organization corresponds to at least one key performance indicator.

7. The computer-implemented method of claim 1, wherein the data structure is stored on a device associated with the user.

8. The computer-implemented method of claim 1, wherein the rendering comprises:
   determining whether the user is authorized to view the data corresponding to the organization based at least in part on the user context.

9. The computer-implemented method of claim 1, wherein:
   the data corresponding to the organization comprises one or more annotations corresponding to the characteristics of the user; and
   the rendering is based on at least some of the one or more annotations.

10. A non-transitory processor-readable storage medium having stored therein program code of one or more software programs, wherein the program code when executed by at least one processing device causes the at least one processing device:
   to obtain information comprising characteristics of a user within an organization, wherein at least one of the characteristics corresponds to at least one role of the user;
   to generate a user context for the user based on the information;
   to generate a data structure comprising mappings between the user context and one or more initial intents associated with the characteristics of the user;
   to process at least one user input using one or more natural language understanding techniques to identify at least one language-based intent;
   to determine a derived intent based at least in part on the at least one language-based intent and the user context;
   to dynamically update the data structure based on the derived intent; and
   to render data corresponding to the organization to a visual dashboard of the user based at least in part on the updated data structure.

11. The non-transitory processor-readable storage medium of claim 10, wherein the at least one user input is processed in response to rendering initial data corresponding to the organization to the visual dashboard based at least in part on the mappings between the user context and one or more initial intents.

12. The non-transitory processor-readable storage medium of claim 10, wherein the at least one user input comprises a natural language input that requests the data.

13. The non-transitory processor-readable storage medium of claim 10, wherein the data structure is updated to include a mapping between the derived intent and the data.

14. The non-transitory processor-readable storage medium of claim 10, wherein the characteristics further comprise at least one of: one or more organization levels associated with the user, one or more job types associated with the user, one or more job profiles associated with the user, one or more projects assigned to the user, and one or more groups associated with the user.

15. The non-transitory processor-readable storage medium of claim 10, wherein the data corresponding to the organization corresponds to at least one key performance indicator.

16. An apparatus comprising:
   at least one processing device comprising a processor coupled to a memory;
   the at least one processing device being configured:
   to obtain information comprising characteristics of a user within an organization, wherein at least one of the characteristics corresponds to at least one role of the user;
   to generate a user context for the user based on the information;
   to generate a data structure comprising mappings between the user context and one or more initial intents associated with the characteristics of the user;
   to process at least one user input using one or more natural language understanding techniques to identify at least one language-based intent;
   to determine a derived intent based at least in part on the at least one language-based intent and the user context;
   to dynamically update the data structure based on the derived intent; and
   to render data corresponding to the organization to a visual dashboard of the user based at least in part on the updated data structure.

17. The apparatus of claim 16, wherein the at least one user input is processed in response to rendering initial data corresponding to the organization to the visual dashboard based at least in part on the mappings between the user context and one or more initial intents.

18. The apparatus of claim 16, wherein the at least one user input comprises a natural language input that requests the data.

19. The apparatus of claim 16, wherein the data structure is updated to include a mapping between the derived intent and the data.

20. The apparatus of claim 16, wherein the characteristics further comprise at least one of: one or more organization levels associated with the user, one or more job types associated with the user, one or more job profiles associated with the user, one or more projects assigned to the user, and one or more groups associated with the user.

* * * * *